United States Patent
Mustakangas et al.

(10) Patent No.: US 12,458,910 B2
(45) Date of Patent: Nov. 4, 2025

(54) FILTER PLATE FRAME ASSEMBLY, A HORIZONTAL FILTER PRESS, SUCH AS A TOWER PRESS, HAVING SUCH A PLATE FRAME ASSEMBLY, AND A METHOD OF REPLACING WORN COMPONENTS OF HORIZONTAL FILTER PRESS

(71) Applicant: Metso Finland Oy, Espoo (FI)

(72) Inventors: Mirva Mustakangas, Pirkkala (FI); Ismo Juvonen, Rauha (FI); Janne Kaipainen, Halsua (FI); Teemu Eloranta, Luumäki (FI); Mika Illi, Vantaa (FI); Kari Vänttinen, Espoo (FI)

(73) Assignee: METSO FINLAND OY, Espoo (FI)

( * ) Notice: Subject to any disclaimer, the term of this patent is extended or adjusted under 35 U.S.C. 154(b) by 349 days.

(21) Appl. No.: 17/792,853

(22) PCT Filed: Apr. 17, 2020

(86) PCT No.: PCT/FI2020/050256
§ 371 (c)(1),
(2) Date: Jul. 14, 2022

(87) PCT Pub. No.: WO2021/209681
PCT Pub. Date: Oct. 21, 2021

(65) Prior Publication Data
US 2023/0023076 A1  Jan. 26, 2023

(51) Int. Cl.
*B01D 25/21* (2006.01)
*B01D 25/164* (2006.01)
*B01D 25/28* (2006.01)

(52) U.S. Cl.
CPC ......... *B01D 25/215* (2013.01); *B01D 25/164* (2013.01); *B01D 25/281* (2013.01)

(58) Field of Classification Search
CPC .. B01D 25/215; B01D 25/164; B01D 25/281; B01D 25/28; B01D 25/285; B01D 35/14
(Continued)

(56) References Cited

U.S. PATENT DOCUMENTS

| | | |
|---|---|---|
| 3,931,014 A | 1/1976 | Heimbach |
| 4,617,863 A | 10/1986 | Kenyon |

(Continued)

FOREIGN PATENT DOCUMENTS

| | | |
|---|---|---|
| CN | 101287530 B | 10/2008 |
| CN | 101708390 B | 10/2011 |

(Continued)

OTHER PUBLICATIONS

Extended European Search Report for European Patent Application No. 20931607.4, dated Nov. 22, 2023.
(Continued)

*Primary Examiner* — Madeline Gonzalez
(74) *Attorney, Agent, or Firm* — Andrus Intellectual Property Law, LLP

(57) ABSTRACT

A filter plate frame assembly with a filter plate frame and a subframe housed within the frame, such that the subframe can be removed from the frame without removing the frame from the filter press. In this way, consumable components can be provided in connection with the subframe, which can be easily removed from the filter press. This, in turn, makes replacement of worn components faster, as the whole frame does not need to be removed from the filter press. An associated horizontal filter press and a method of replacing worn components of such a filter press is also provided.

13 Claims, 2 Drawing Sheets

(58) Field of Classification Search
USPC .......................... 210/224–232, 331, 346, 486
See application file for complete search history.

(56) References Cited

U.S. PATENT DOCUMENTS

| | | | |
|---|---|---|---|
| 4,749,482 A | 6/1988 | Bonn | |
| 2005/0199559 A1 | 9/2005 | Duby | |
| 2015/0336032 A1* | 11/2015 | Duby | .................. B01D 25/386 |
| | | | 210/791 |

FOREIGN PATENT DOCUMENTS

| | | |
|---|---|---|
| CN | 102225259 B | 4/2013 |
| CN | 103055558 A | 4/2013 |
| CN | 110541512 A | 12/2019 |
| EP | 0145399 A2 | 6/1985 |
| GB | 2069360 A | 8/1981 |

OTHER PUBLICATIONS

International Search Report and Written Opinion for PCT Application No. PCT/FI2020/050256, mailed Jul. 15, 2020.
Office Action for ARIPO Patent Application No. AP/P/2022/014231, dated May 2, 2025, received May 19, 2025.

* cited by examiner

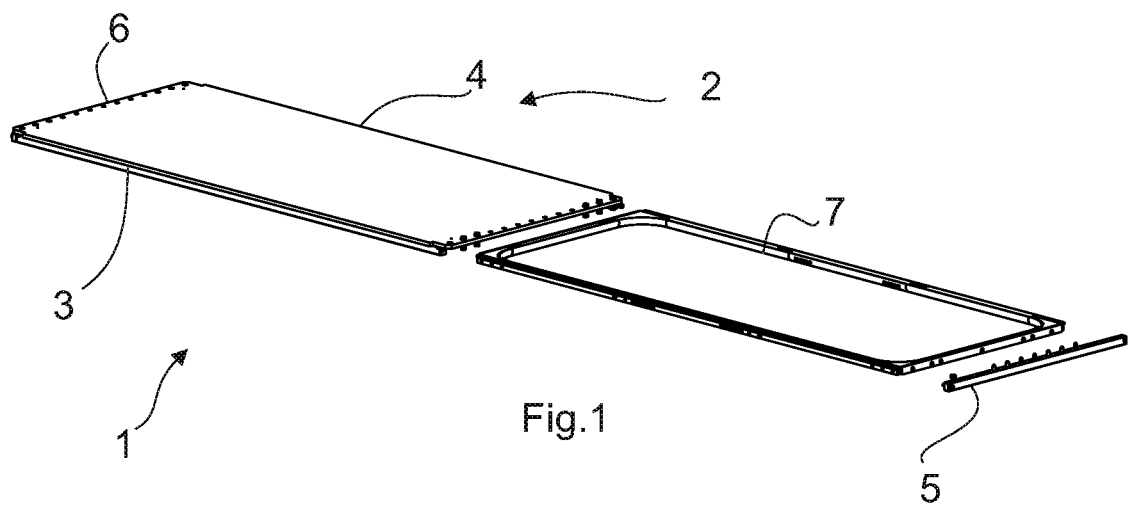
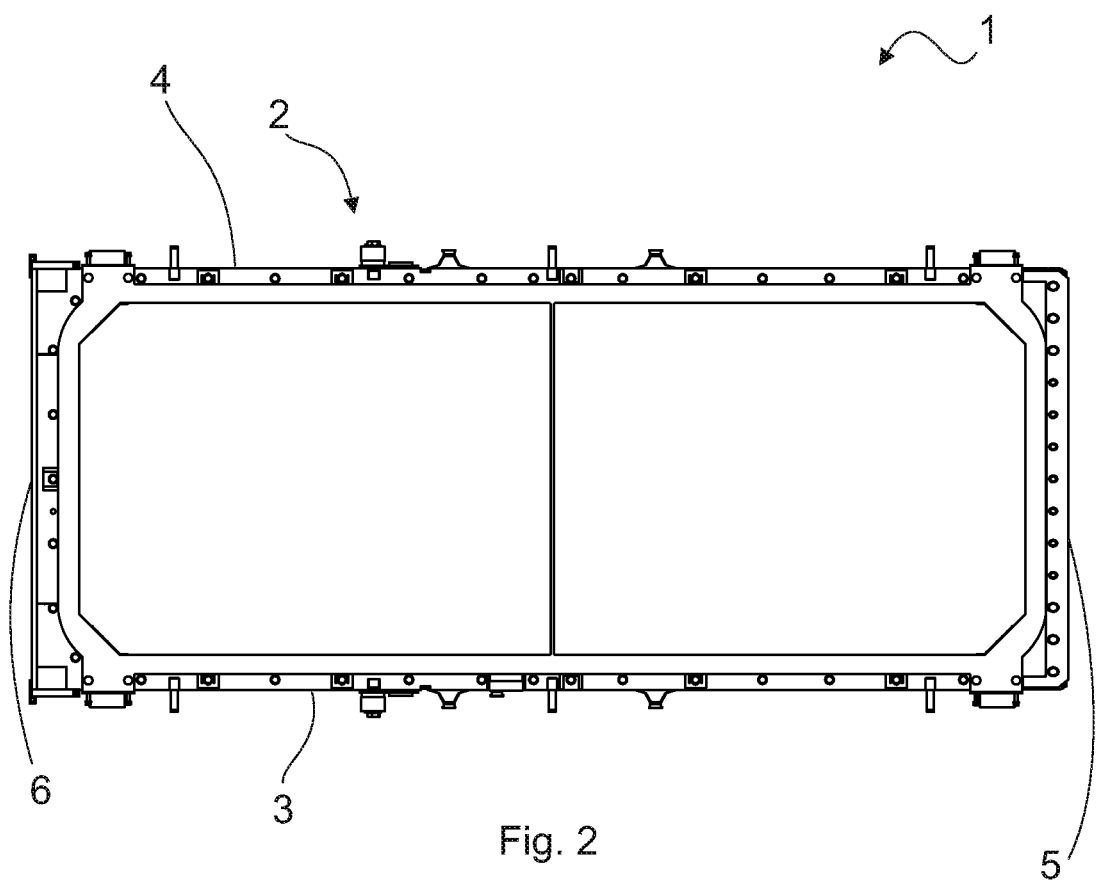

FILTER PLATE FRAME ASSEMBLY, A HORIZONTAL FILTER PRESS, SUCH AS A TOWER PRESS, HAVING SUCH A PLATE FRAME ASSEMBLY, AND A METHOD OF REPLACING WORN COMPONENTS OF HORIZONTAL FILTER PRESS

CROSS-REFERENCE TO RELATED APPLICATIONS

This application is the U.S. national stage application of International Application PCT/FI2020/050256, filed Apr. 17, 2020, which international application was published on Oct. 21, 2021, as International Publication WO 2021/209681 A1 in the English language.

FIELD OF THE DISCLOSURE

The present disclosure relates to horizontal filter presses, such as tower presses, and more particularly to a filter plate frame assembly for such a filter press.

BACKGROUND OF THE DISCLOSURE

In horizontal filter presses, a horizontally extending filter chamber is formed between adjacent, superimposed filter plate frame assemblies. During the filtration cycle, the filter plate assemblies are pressed against each other to seal the filter chamber, and a slurry is introduced into the filter chamber with a filtration pressure typically ranging between 8-20 bar over the ambient pressure. The filtrate is separated from the slurry by a filter medium. The filtrate is conducted to further processing, while the solids content of the slurry form a filter cake in the filter chamber. The filter cake is removed from the filter chamber by lifting the filter plate frame assemblies such that they move away from each other (i.e., opening the filter chamber). The filter medium, typically forming an endless loop in a zig-zag-pattern, is advanced and the filter cake is discharged by dropping it from on top of the filter medium that turns around a roller.

The filter plate frame assembly comprises multiple wearing components (such as seals and diaphragms) that must be replaced periodically. To replace these components the whole filter frame assembly has to be removed, which is time consuming and currently requires the filter press to be out of operation during replacement. Alternatively, worn components may be replaced in place (i.e. without removing the filter plate frame assembly). However, this requires additional precautionary safety measures and the operators must pay great attention to safety instructions and regulations. If the precautionary safety measures and instructions are not followed, a serious risk of injury may be posed as work is done under one or more suspended filter plate frame assemblies

BRIEF DESCRIPTION OF THE DISCLOSURE

An object of the present disclosure is to provide filter plate frame assembly and a filter press incorporating such a filter plate frame assembly, which provides for replacement of worn components with less downtime of the associated filter press and increase the safety of such an operation.

The object of the disclosure is achieved by a filter plate frame assembly and a filter press which are characterized by what is stated in the independent claims. The preferred embodiments of the disclosure are disclosed in the dependent claims.

The disclosure is based on the idea of providing a filter plate frame assembly with a filter plate frame having a sufficiently rigid structure to withstand the forces associated with the operation of the filter press, and a subframe housed within the frame, such that the subframe can be removed from the frame without removing the frame from the filter press.

In this way, consumable components can be provided in connection with the subframe, which can be easily removed from the filter press. This, in turn, makes replacement of worn components faster, as the whole frame does not need to be removed from the filter press. Moreover, as the subframe can be made with a less rigid structure than the frame itself, the subframe can be more easily manipulated when removed from the frame, further facilitating replacement of worn parts.

Finally, the arrangement according to the present disclosure enables the use of a replacement subframe, which can be hold in storage with new consumables already fitted thereon. This even further fastens the replacement process and reduces down time of the filter press, as all consumables can be replaced at once simply by removing the subframe from the frame and inserting a new one. After a new subframe has been installed, the old subframe can be refurbished by replacing worn components while the filter press can already be operated.

Furthermore, safety of the replacement procedure is increased, as the operators no longer would benefit from replacing worn component in place.

BRIEF DESCRIPTION OF THE DRAWINGS

In the following the disclosure will be described in greater detail by means of preferred embodiments with reference to the accompanying drawings, in which FIG. 1 schematically illustrates a filter plate frame assembly according to an embodiment of the present disclosure, as seen as a simplified, perspective exploded view;

FIG. 2 schematically illustrates a filter plate frame assembly according to an embodiment of the present disclosure, as seen as a plan view;

DETAILED DESCRIPTION OF THE DISCLOSURE

Figure 3:
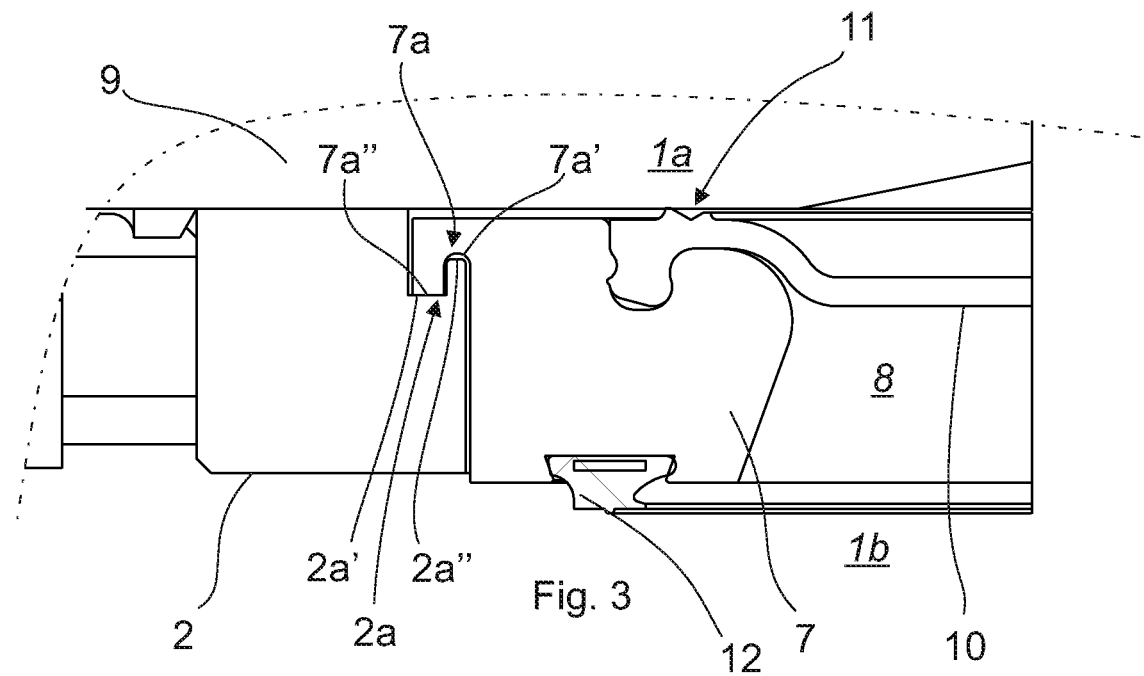
FIG. 3 schematically illustrates a filter plate frame assembly according to an embodiment of the present disclosure, as seen as a partial cross-sectional cut view where the subframe is in a lowermost position.

According to a first aspect of the present disclosure, a filter plate frame assembly 1 for a vertical filter press, such as tower press, is provided.

The plate frame assembly comprises a rigid plate frame 2 having a first frame flank 3 and an opposing second frame flank 4 parallel to the first frame flank 5. The plate frame further comprises a first frame end 5 and an opposing second frame end 6 parallel to the to the first frame end 5. The frame flanks 3, 4 and frame ends 5, 6 of the filter frame 2 define a closed periphery of the filter frame 2.

Preferably but not necessarily, the frame 2 is attachable to a support structure of an associated filter press by the frame flanks 3, 4. Moreover, most suitably the frame flanks 3, 4 have a length greater than that of the frame ends 5, 6. That is, the frame 2 extends further in the direction of the flanks 3, 4 than in the direction of the frame ends 5, 6.

The filter plate frame assembly further comprises a subframe 7 nested within and laterally delimited by the filter plate frame 2. The subframe 7 has a central opening 8 having a closed area, and defining a lateral boundary of an associated filter chamber, when in use.

Particularly, either or both of the first frame end 5 and the second frame end 6 is an openable frame end, such that the subframe 7 is receivable into, and respectively, removable out from the filter plate frame 2 via the openable frame end 5. Moreover, the subframe 7 is secured within the filter plate frame 2 when the openable frame end 5 is closed.

For example, the frame 2 may be made of steel, whereas the subframe 7 may be made of a plastics material.

Preferably, but not necessarily, the openable frame end 5 is attachable at least to the remaining plate frame 2. More preferably, the openable frame end 5 is additionally attachable to the filter plate 9 supported by the frame 2.

In an embodiment according to the first aspect of the present disclosure, the openable frame end 5 is provided as a releasably fixed section of the periphery formed by the filter plate frame 2.

Alternatively, the periphery formed by the filter plate frame 2 may comprises an opening (not illustrated) at an end of the frame, such that the openable frame end covers the opening, when fixed to the filter plate frame 2.

In an embodiment according to the first aspect, the filter plate frame 2 comprises a first bearing surface 2$a$ opening towards a plate side 1$a$ of the filter plate frame assembly 1 and running at least along both the first frame flank 3 and the second frame flank 4. Correspondingly, the subframe 7 comprises a second bearing surface 7$a$ opening towards the chamber side 1$b$ of the filter plate frame assembly 1. Moreover, the first bearing surface 2$a$ and the second bearing surface 7$a$ are configured such that the filter plate subframe 7 is supported on and slidable along the first bearing 2$a$ surface at the second bearing surface 7$a$. Particularly, the first bearing surface 2$a$ supports the subframe at the second bearing surface 7$a$ in a direction perpendicular to the horizontally extending filter inner opening, i.e. in a vertical direction against gravity, when in use.

In the context of the present disclosure, the plate side 1$a$ is used to depict a side of the filter plate frame assembly 1, with respect to the planarity defined by the filter frame 2, on which a filter plate 9 associated to it resides or is to be provided. Moreover, in the context of the present disclosure, the chamber side 1$b$ is used to depict a side of the filter plate frame assembly 1, with respect to the planarity defined by the filter frame 2, on which a filter chamber is formed, and towards which side the filter chamber is open. In other words, in the situation illustrated in FIGS. 3 and 4, the filter plate side 1$a$ is above the filter plate frame assembly 1, and the chamber side 1$b$ is below the filter plate frame assembly 1.

For example, the first bearing surface 2$a$ could be provided by forming a shelf on the frame 2, which then receives and support a corresponding ledge formed on the subframe 7. Alternatively, the frame 2 could be provided with a geometry constituting a U- or L-shaped rail configured for receiving and supporting a laterally projecting part of the subframe. Naturally, other arrangements could be provided, as discussed below.

Preferably, but not necessarily, the first bearing surface 2$a$ comprises a groove 2$a'$ and a ridge 2$a''$ extending longitudinally along either or both of the first flank 3 or the second flank 4. Moreover, the second bearing surface 7$a$ then also comprises a groove 7$a'$ and ridge 7$a''$ extending longitudinally on a side or sides corresponding to either or both of the first flank 3 or the second flank 4. Particularly, wherein the groove 2$a'$ of the first bearing surface 2$a$ is configured to form fittingly receive the ridge 7$a''$ of the second bearing surface 7$a$, and the groove 7$a'$ of the second bearing surface 7$a$ is configured to from-fittingly receive the ridge 2$a''$ of the first bearing surface 2$a$. Most suitably, the groove 2$a'$ and the ridge 2$a''$ of the first bearing surface 2$a$ open and project, respectively, towards the plate side 1$a$ of the plate frame 2, whereas the groove 7$a'$ and the ridge 7$a''$ of the second bearing surface open and project towards the chamber side 1$b$ of the subframe 7.

Such a geometry of the bearing surfaces 2$a$, 7$a$ helps retain the subframe laterally in place (i.e., in a direction coplanar with the frame 2 and subframe 7, and transverse to the longitudinal direction of the frame flanks 3, 4) while allowing the subframe 7 to be slid out of the frame 2. Moreover, such geometry of the bearing surface keep the subframe in proper orientation with respect to the frame during insertion of the subframe 7, thus preventing the latter from getting wedged within the frame 2. Finally, such a geometry of the bearing surfaces 2$a$, 7$a$ provides for transferring lateral forces between the subframe and the frame, thus helping the subframe to maintain its proper shape.

Figure 4:
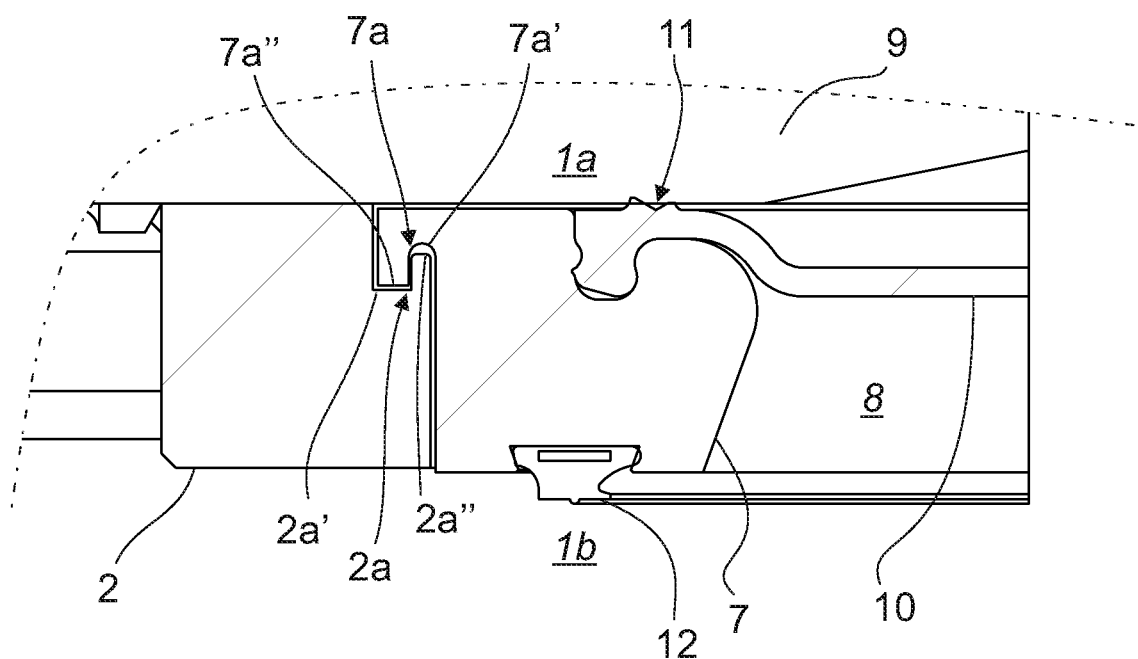
FIG. 4 illustrates the filter plate frame assembly of FIG. 3, as seen as a partial cross-sectional cut view where the subframe is in an uppermost position.

Although the embodiments illustrated in FIGS. 3 and 4 show the grooves 2$a'$, 7$a'$, and ridges 2$a''$, 7$a''$ of the first and second bearing surfaces 2$a$, 7$a$ provided in staggered configuration, they could alternatively also be provided as a continuous curved contour, as inclined linear surface, or a combination of the above.

In an embodiment according to the first aspect, the filter plate frame 2 is provided with a generally rectangular shape, i.e., the frame ends 5, 6 are provided transverse to the frame flanks 3, 4. Preferably also the subframe is similarly of a generally rectangular shape.

In an embodiment according to the first aspect, the filter plate frame assembly 1 further comprises a filter plate 9 attached onto the filter plate frame 2 on the plate side 1$a$ of the filter plate frame assembly 1, such that the filter plate 9 covers at least an area delimited by the filter plate frame 2. The purpose of the filter plate 9 is to support a filtrate vat, into which filtrate is received from filer chamber formed by an adjacent filter plate frame assembly 1 during operation.

Preferably, but not necessarily, the subframe 7 is secured in a direction perpendicular to a plane defined by the filter plate frame assembly (i.e., in the vertical direction) between the filter plate frame 2 and the filter plate 9, such that a free play of the filter plate subframe 7 is allowed in said direction with respect to the filter frame 2 and the filter plate 9. This help removal and replacement of the subframe from the frame.

More preferably, but not necessarily, the filter plate frame assembly 1 further comprises a diaphragm 10 having a flexible structure (i.e. being able to yield without permanent deformation so as to squeeze a filter cake formed in the filter chamber). The diaphragm 10 covers an area delimited by the subframe 7. That is, the diaphragm 10 extends over the lateral boundaries of the filter chamber formed within the subframe 7. Moreover, the diaphragm 10 is attached to the subframe 7 and resides, in a vertical direction, between the subframe 7 and the filter plate 9.

Most preferably, but not necessarily, the diaphragm 10 comprises a continuous seal bead 11 for sealing the diaphragm 10 against the filter plate 9. Suitably, the seal bead 11 runs around the periphery of the diaphragm 10. Moreover, the free play between the subframe 7 and the filter plate 9 allows the seal 11 to be detached from the plate 9, when the subframe is not pressed towards the filter plate (i.e., when the subframe 7 is in a lowermost position of its free play), and further, allows the seal 11 to abut the filter plate 9 when the subframe is pressed towards the filter plate (i.e., when the subframe 7 is in an uppermost position of its free play).

Alternatively, the diaphragm 10 comprises a continuous seal bead 11 for sealing the diaphragm 10 against the filter plate 9. Suitably, the seal bead 11 runs around the periphery of the diaphragm 10. Moreover, the free play between the subframe 7 and the filter plate 9 allows the seal 11 to engage with the filter plate 9 so as to provide sealing against a first pressure differential and to leak under a second, higher pressure differential, when the subframe 7 is not pressed towards the filter plate 9 (i.e., when the subframe 7 is in a lowermost position of its free play). Moreover, the free play between the subframe 7 and the filter plate 9 allows the seal 11 to engage with the filter plate 9 so as to provide sealing also against the second pressure differential when the subframe is pressed towards the filter plate (i.e., when the subframe 7 is in an uppermost position of its free play).

For example, this could be achieved by providing the seal bead with two seal lips, one of which is elevated higher from the diaphragm 10 than the other. Most suitably a seal lip elevated higher is provided on a lateral outside of the diaphragm with respect to the seal lip elevated lower. Alternatively, or additionally, the seal lip elevated higher may have a directional self-sealing geometry against an overpressure prevailing on the lateral outside, while the seal lip elevated lower may have a directional self-sealing geometry against an overpressure prevailing on the lateral inside.

In an embodiment according to the first aspect, the filter plate frame assembly 1 further comprises a sealing strip 12 attached onto the subframe 7 on the frame side thereof for sealing the filter chamber formed on central opening of the subframe against a filter plate of an adjacent filter plate frame assembly 1 below the subframe 7. As the sealing strip 12 is attached to the subframe 7, it can also be replaced without removal of the whole filter plate frame assembly 1.

It should be noted that the first aspect of the present disclosure encompasses any combination of two or more embodiments, or variants thereof, as discussed above.

According to a second aspect of the present disclosure, a horizontal filter press, such as a tower press, is provided.

The filter press comprises a plurality of filter plate frame assemblies 1 to the first aspect, such that the filter plate frame assemblies 1 are configured movable towards each other into a closed position in which a filter chamber is formed between adjacent filter plate frame assemblies 1, and away from each to an open position in which adjacent filter plate frame assemblies 1 are spaced apart from each other.

The filter press further comprises a filter medium arranged between adjacent filter plate frame assemblies 1.

The filter press further comprises a translation arrangement for moving the filter plate frame assemblies 1 towards each other so as to form a filter chamber between adjacent filter plate frame assemblies 1, and away from each other so as to open the filter chamber.

The filter press further comprises a feed arrangement for feeding slurry into the filter chamber a recovering arrangement for recovering filtrate from the filter chamber.

The filter press further comprises a discharge arrangement for discharging a filter cake formed within the filter chamber.

According to a third aspect of the present disclosure, a method of replacing worn components on the filter press according to the second aspect of the present disclosure is provided.

The method comprises comprising the following succession of steps:
opening a filter chamber by moving an associated upper filter plate frame assembly 1 away from an associated lower filter plate frame assembly 1 with the translation arrangement;
opening an openable end of the associated lower plate frame assembly 1;
removing a subframe 7 having worn components from the frame 2 of the lower plate frame assembly 1 via the openable end;
inserting a subframe 7 having unworn or refurbished components into the frame 2 of the lower plate frame assembly 1 via the openable end, and
closing the openable end of the lower plate frame assembly 1.

FIG. 1 schematically illustrates a filter plate frame assembly according to an embodiment of the present disclosure, as seen as a perspective exploded view. It should be noted, that FIG. 1 represent a simplified drawing of the filter plate frame assembly, for the purpose of illustrating that the subframe 7 is removable from the frame 2. Particularly, the details of the filter plate have been omitted. That is, the openable frame end 5 has been removed from the frame 2 and the subframe 7 has been completely withdrawn from the plate frame 2.

FIG. 2 schematically illustrates a filter plate frame assembly according to an embodiment of the present disclosure in a non-exploded configuration, as seen as a plan view. It should be noted that particularly the details of the filter plate illustrated in FIG. 2 represent only an exemplary configuration, and that other configurations are encompassed by the present disclosure. The line and arrows running across the first frame flank 3 indicate the section along which the view of FIG. 3 is cut.

FIG. 3 schematically illustrates a filter plate frame assembly according to an embodiment of the present disclosure, as seen as a partial cross-sectional cut view where the subframe 7 is in a lowermost position (i.e., when adjacent filter frame assemblies are spaced apart from each other). The filter diaphragm 10 is attached to a profiled groove on the subframe 7 with a correspondingly profiled bead of the diaphragm 10. The filter subframe 7, in turn, is attached to a filter frame 2 in a manner allowing a limited vertical travel. The filter frame 2, in turn is fixed with respect to filter plate 9, against which the seal bead 11 of the diaphragm 10 engages. Particularly, in the lowermost position of FIG. 3, only a laterally outer seal lip of the bead 11 engages against the filter plate 9. This allows an underpressure to be exerted into the space between the diaphragm 10 and the filter plate 9, thereby lifting a central portion of the diaphragm 10 up so as to facilitate removal of the filter cake from the filter chamber. Moreover, as only the laterally outer seal lip is engaged against the filter plate 9, accidental overpressurization of the space between the diaphragm 10 and the filter plate 9 would cause the seal bead 11 to leak, thus preventing the overpressure from excessively inflating the diaphragm.

FIG. 4 illustrates the filter plate frame assembly of FIG. 3, as seen as a partial cross-sectional cut view where the subframe is in an uppermost position (i.e., when the filter chamber is closed and adjacent filter plate frame assemblies 1 are pressed towards each other. In this situation a filter plate 9 of an adjacent filter plate below that of FIG. 4 pushes the subframe 7 upwards to an uppermost position of its limited travel. Consequently, both the laterally outer seal lip and the laterally inner seal lip of the bead 11 are engaged against the filter plate 9. As a result, a sufficient overpressure can be introduced into the space between the diaphragm 10 and the filter plate 9, so as to squeeze remaining liquid contents out of a filter cake.

LIST OF REFERENCE NUMERALS

1 filter plate frame assembly
1a plate side
1b frame side
2 filter plate frame
2a first bearing surface of plate frame
2a' groove of first bearing surface
2a" ridge of first bearing surface
3 first frame flank
4 second frame flank
5 first frame end
6 second frame end
7 subframe
7a second bearing surface of subframe
7a' groove of second bearing surface
7a" ridge of second bearing surface
8 central opening of subframe
9 filter plate
10 diaphragm
11 seal bead of diaphragm
12 sealing strip

The invention claimed is:

1. A filter plate frame assembly for a horizontal filter press, comprising:
a rigid filter plate frame having a first frame flank and an opposing second frame flank parallel to the first frame flank, and a first frame end and an opposing second frame end parallel with the first frame end, wherein the frame flanks and frame ends of the filter frame define a closed periphery; and
a subframe nested within and laterally delimited by the filter plate frame, wherein the subframe has a central opening having a closed area that is configured to define a lateral boundary of an associated filter chamber, when in use,
wherein either or both of the first frame end and the second frame end is an openable frame end, and
wherein the subframe is receivable into, and respectively, removable out from the filter plate frame via the openable frame end,
wherein the subframe is secured within the filter plate frame when the openable frame end is closed,
wherein the filter plate frame comprises a first bearing surface opening towards a plate side of the filter plate frame assembly and running at least along both the first frame flank and the second frame flank,
wherein the subframe comprises a second bearing surface opening towards the chamber side of the filter plate frame assembly, and
the filter plate subframe is supported on and slidable along the first bearing surface at the second bearing surface.

2. The filter plate frame assembly according to claim 1, wherein the openable frame end is provided as a releasably fixed section of the periphery formed by the filter plate frame.

3. The filter plate frame assembly according to claim 1, wherein the periphery formed by the filter plate frame comprises an opening at an end of the frame, wherein the openable frame end covers the opening, when fixed to the filter plate frame.

4. The filter plate frame assembly according to claim 1, wherein the first bearing surface comprises a groove and a ridge extending longitudinally along either or both of the first flank or the second flank,
the second bearing surface comprises a groove and ridge extending longitudinally on a side or sides corresponding to either or both of the first flank or the second flank,
wherein the groove of the first bearing surface is configured to form fittingly receive the ridge of the second bearing surface and the groove of the second bearing surface is configured to from-fittingly receive the ridge of the first bearing surface.

5. The filter plate frame assembly according to claim 1, wherein the filter plate frame is of a generally rectangular shape.

6. The filter plate frame assembly according to claim 1, further comprising a filter plate attached onto the filter plate frame on the plate side of the filter plate frame assembly, and covering at least an area delimited by the filter plate frame.

7. The filter plate frame assembly according to claim 6, wherein the subframe is secured in a direction perpendicular to a plane defined by the filter plate frame assembly between the filter plate frame and the filter plate, such that a free play of the filter plate subframe is allowed in said direction.

8. The filter plate frame assembly according to claim 7, further comprising a diaphragm covering an area delimited by the subframe, wherein the diaphragm is attached to the subframe and resides between the subframe and the filter plate.

9. The filter plate frame assembly according to claim 8, wherein the diaphragm comprises a continuous seal bead for sealing the diaphragm against the filter plate, wherein the free play allowed between the subframe and the filter plate allow the seal to be detached from the plate when the subframe is not pressed towards the filter plate, and the seal to abut the filter plate when the subframe is pressed towards the filter plate.

10. The filter plate frame assembly according to claim 8, wherein the diaphragm comprises a continuous seal bead for sealing the diaphragm against the filter plate, wherein the free play allowed between the subframe and the filter plate allow the seal bead to
when the subframe is not pressed towards the filter plate, engage therewith so as to provide sealing against a first pressure differential, and to leak under a second, higher pressure differential, and
when the subframe is pressed towards the filter plate, engage therewith so as to provide sealing against the second pressure differential.

11. The filter plate frame according to claim 1, wherein the filter plate frame assembly further comprises a sealing strip configured for sealing the filter chamber formed on the central opening of the subframe against a filter plate of an adjacent filter plate frame assembly below the subframe, wherein the sealing strip is attached to the subframe, on the frame side thereof.

12. A horizontal filter press, wherein the filter press comprises:
a plurality of filter plate frame assemblies according to claim 1, wherein the filter plate frame assemblies are configured movable towards each other into a closed position in which a filter chamber is formed between adjacent filter plate frame assemblies, and away from each to an open position in which adjacent filter plate frame assemblies are spaced apart from each other.

13. A method of replacing worn components on the filter press according to claim 11, comprising the steps of:
- opening a filter chamber by moving an associated upper filter plate frame assembly away from an associated lower filter plate frame assembly with the translation arrangement;
- opening an openable end of the associated lower plate frame assembly;
- removing a subframe having worn components from the frame of the lower plate frame assembly via the openable end;
- inserting a subframe having unworn or refurbished components into the frame of the lower plate frame assembly via the openable end; and
- closing the openable end of the lower plate frame assembly.

\* \* \* \* \*